(12) United States Patent
Mogensen et al.

(10) Patent No.: US 11,703,737 B2
(45) Date of Patent: Jul. 18, 2023

(54) FORMING ELECTROCHROMIC STACKS USING AT MOST ONE METALLIC LITHIUM DEPOSITION STATION

(71) Applicant: SAGE Electrochromics, Inc., Faribault, MN (US)

(72) Inventors: Paul Mogensen, Chantilly (FR); Wen Li, Lakeville, MN (US); Jean-Christophe Giron, Edina, MN (US); Nicolas Antoine Mercadier, Minneapolis, MN (US)

(73) Assignee: SAGE Electrochromics, Inc., Faribault, MN (US)

( * ) Notice: Subject to any disclaimer, the term of this patent is extended or adjusted under 35 U.S.C. 154(b) by 141 days.

(21) Appl. No.: 17/172,960

(22) Filed: Feb. 10, 2021

(65) Prior Publication Data
US 2021/0247654 A1 Aug. 12, 2021

Related U.S. Application Data

(60) Provisional application No. 62/975,625, filed on Feb. 12, 2020.

(51) Int. Cl.
*G02F 1/155* (2006.01)
(52) U.S. Cl.
CPC .................................. *G02F 1/155* (2013.01)
(58) Field of Classification Search
CPC ....... G02F 1/155; G02F 1/1533; G02F 1/1534
See application file for complete search history.

(56) References Cited

U.S. PATENT DOCUMENTS

| 6,039,850 A | 3/2000 | Schulz |
| 8,687,261 B2 * | 4/2014 | Gillaspie ............... G02F 1/1524 |
| | | 359/269 |

(Continued)

FOREIGN PATENT DOCUMENTS

| EP | 2414891 | 11/2016 |
| WO | 2010077368 A2 | 7/2010 |

OTHER PUBLICATIONS

Office Action dated Aug. 2, 2021 in Taiwanese patent application No. 110105332, Sage Electrochromics, Inc., pp. 1-13 (including translation).

(Continued)

*Primary Examiner* — Fred Tzeng
(74) *Attorney, Agent, or Firm* — Robert C. Kowert; Kowert, Hood, Munyon, Rankin & Goetzel, P.C.

(57) ABSTRACT

The present disclosure describes various processes of forming an electrochromic stack using at most one metallic lithium deposition station. In some aspects, a process may include depositing metallic lithium only within an electrochromic counter-electrode of an electrochromic stack. In some aspects, a process may include using a lithium-containing ceramic counter-electrode target to form an electrochromic counter-electrode and depositing metallic lithium only within or above an electrochromic electrode of the electrochromic stack. In some embodiments, a process may include using a lithium-containing ceramic electrode target, and optionally additionally depositing metallic lithium to add mobile lithium to the electrochromic stack. In some embodiments, a process may include using a single metallic lithium deposition station to deposit metallic lithium between an ion-conducting layer and an electrochromic electrode of the electrochromic stack.

20 Claims, 13 Drawing Sheets

(56) References Cited

U.S. PATENT DOCUMENTS

| | | | |
|---|---|---|---|
| 8,842,357 B2* | 9/2014 | Nguyen | C23C 14/083 359/265 |
| 9,395,593 B2 | 7/2016 | Choi et al. | |
| 2009/0057137 A1 | 3/2009 | Pitts et al. | |
| 2009/0323155 A1 | 12/2009 | Phillips | |
| 2009/0323161 A1* | 12/2009 | Fuss | G02F 1/1533 359/275 |
| 2010/0243427 A1* | 9/2010 | Kozlowski | G02F 1/1533 427/126.6 |
| 2011/0151283 A1 | 6/2011 | Gillaspie et al. | |
| 2013/0182307 A1 | 7/2013 | Gillaspie et al. | |
| 2014/0016173 A1* | 1/2014 | Gillaspie | G02F 1/155 359/265 |
| 2014/0043666 A1 | 2/2014 | Weir et al. | |
| 2014/0182125 A1 | 7/2014 | Rozbicki et al. | |
| 2014/0313561 A1* | 10/2014 | Wang | C23C 14/083 204/298.13 |
| 2015/0362819 A1 | 12/2015 | Bjornard et al. | |
| 2016/0103379 A1* | 4/2016 | Kozlowski | G02F 1/155 228/111.5 |
| 2016/0209722 A1* | 7/2016 | Wang | G02F 1/155 |
| 2016/0327846 A1* | 11/2016 | Kailasam | G02F 1/155 |
| 2017/0184937 A1* | 6/2017 | Wang | H01J 37/3426 |
| 2017/0269449 A1* | 9/2017 | Gillaspie | G02F 1/1524 |
| 2017/0307951 A1* | 10/2017 | Rozbicki | G02F 1/1533 |
| 2018/0203320 A1* | 7/2018 | Kailasam | G02F 1/1533 |
| 2018/0348589 A1 | 12/2018 | Burdis et al. | |
| 2019/0346730 A1* | 11/2019 | Bulja | G02F 1/1533 |
| 2020/0041857 A1* | 2/2020 | Wang | G02F 1/1533 |
| 2020/0089071 A1* | 3/2020 | Gillaspie | C09K 9/00 |
| 2020/0209698 A1* | 7/2020 | Wang | G02F 1/155 |
| 2022/0055943 A1* | 2/2022 | Kozlowski | G02F 1/1533 |

OTHER PUBLICATIONS

International Search Report and Written Opinion dated Jun. 7, 2021 in Application No. PCT/US2021/017732, Sage Electrochromics, Inc., pp. 1-12.

* cited by examiner

| $WO_x$ (400 nm) |
|---|
| ITO (420 nm) |
| $SiO_2$ (30 nm) |
| $Nb_2O_5$ (10 nm) |
| Glass substrate |

Tempered Electrochromic
Electrode (without Metallic Li)

Properties after tempering:
Charge Capacity: 65 $mC/cm^2$
Contrast: 14

| Metallic Li (1 $\mu g/cm^2$) |
|---|
| $WO_x$ (400 nm) |
| ITO (420 nm) |
| $SiO_2$ (30 nm) |
| $Nb_2O_5$ (10 nm) |
| Glass substrate |

Tempered Electrochromic
Electrode (with Metallic Li)

Properties after tempering:
Charge Capacity: 5 $mC/cm^2$
Contrast: 2.2

| $NiWO_x$ (270 nm) |
|---|
| ITO (420 nm) |
| $SiO_2$ (30 nm) |
| $Nb_2O_5$ (10 nm) |
| Glass substrate |

Tempered Electrochromic
Counter-Electrode (without Metallic Li)

Properties after tempering:
Charge Capacity: ~0 $mC/cm^2$
Contrast: ~1

| Metallic Li (1.4 $\mu g/cm^2$) |
|---|
| $NiWO_x$ (270 nm) |
| ITO (420 nm) |
| $SiO_2$ (30 nm) |
| $Nb_2O_5$ (10 nm) |
| Glass substrate |

Tempered Electrochromic
Counter-Electrode (with Metallic Li)

Properties after tempering:
Charge Capacity: 15 $mC/cm^2$
Contrast: 4.5

FIG. 1

| 302 | 304 | 310 | 320 | 330 | 333 | 336 | 340 | 342 |
|---|---|---|---|---|---|---|---|---|
| Underlayer | Conductive layer | Electrode | IC | Counter-Electrode | Lithium | Counter-Electrode | Conductive layer | Overlayer |
| ($Nb_2O_5$ 10 nm, $SiO_2$ 20 nm) | (ITO 420 nm) | ($WO_x$ 400 nm) | ($SiO_x$ <5 nm) | ($NiWO_x$ X nm) |  | ($NiWO_x$ 270-X nm) | (ITO 420 nm) | ($SiO_x$ 70 nm) |

FIG. 3

| 702 | 704 | 710 | 713 | 714 | 720 | 730 | 740 | 742 |
|---|---|---|---|---|---|---|---|---|
| Underlayer | Conductive layer | Electrode | Lithium | Electrode | IC | Counter-Electrode | Conductive layer | Overlayer |
| (Nb$_2$O$_5$ 10 nm, SiO$_2$ 20 nm) | (ITO 420 nm) | (WO$_x$ X nm) | | (WO$_x$ 400-X nm) | (SiO$_x$ 5 nm) | (LiNiWO$_x$ 270 nm) | (ITO 420 nm) | (SiO$_x$ 70 nm) |

*FIG. 7*

| Underlayer | Conductive layer | Electrode | IC | Counter-Electrode | Conductive layer | Overlayer |
|---|---|---|---|---|---|---|
| (Nb$_2$O$_5$ 10 nm, SiO$_2$ 20 nm) | (ITO 420 nm) | (LiWO$_x$ 400 nm) | (SiO$_x$ 5 nm) | (LiNiWO$_x$ 270 nm) | (ITO 420 nm) | (SiO$_x$ 70 nm) |
| 902 | 904 | 910 | 920 | 930 | 940 | 942 |

FIG. 9

| Underlayer | Conductive layer | Electrode | IC | Counter-Electrode | | Conductive layer | Overlayer |
|---|---|---|---|---|---|---|---|
| (Nb₂O₅ 10 nm, SiO₂ 20 nm) | (ITO 420 nm) | (LiWO$_x$ 400 nm) | (SiO$_x$ 5 nm) | (NiWO$_x$ 270 nm) | Lithium | (ITO 420 nm) | (SiO$_x$ 70 nm) |

1102 — Underlayer
1104 — Conductive layer
1110 — Electrode
1120 — IC
1130 — Counter-Electrode
1133 — Lithium
1140 — Conductive layer
1142 — Overlayer

FIG. 11

| 1302 | 1304 | 1317 | 1320 | 1321 | 1337 | 1340 | 1342 |
|---|---|---|---|---|---|---|---|
| Underlayer | Conductive layer | Counter-Electrode | IC | Lithium | Electrode | Conductive layer | Overlayer |
| (Nb₂O₅ 10 nm, SiO₂ 30 nm) | (ITO 420 nm) | (NiWOₓ 270 nm) | (SiOₓ 5 nm) | | (WOₓ 400 nm) | (ITO 420 nm) | (SiOₓ 70 nm) |

*FIG. 13*

FORMING ELECTROCHROMIC STACKS USING AT MOST ONE METALLIC LITHIUM DEPOSITION STATION

This application claims benefit of priority to U.S. Provisional Application Ser. No. 62/975,625, filed Feb. 12, 2020, entitled "FORMING ELECTROCHROMIC STACKS USING AT MOST ONE METALLIC LITHIUM DEPOSITION STATION", which is hereby incorporated by reference herein in its entirety.

FIELD OF THE DISCLOSURE

The present disclosure is directed to electrochromic stacks, and more particularly to processes of forming electrochromic stacks using at most one metallic lithium deposition station.

BACKGROUND

An electrochromic device helps to block the transmission of visible light and keep a room of a building or passenger compartment of a vehicle from becoming too warm. Electrochromic stacks may be manufactured by sputtering thin film layers by physical vapor deposition, including metallic lithium. Because metallic lithium is extremely inflammable in contact with water, it can only be sputtered in specially engineered sputtering compartments, engineered to be isolated from the rest of the process and, contrary to the vast majority of magnetron chambers, not cooled by water. This makes the inclusion of lithium sputtering compartments into a coater very expensive.

BRIEF DESCRIPTION OF THE DRAWINGS

FIG. 1 depicts electrochromic electrodes and counter-electrodes with and without deposited metallic lithium after heat tempering, according to some embodiments.

FIG. 3 is a block diagram depicting various layers of the electrochromic stack formed according to the process depicted in FIG. 2, according to some embodiments.

FIG. 7 is a block diagram depicting various layers of the electrochromic stack formed according to the process depicted in FIG. 6, according to some embodiments.

FIG. 9 is a block diagram depicting various layers of the electrochromic stack formed according to the process depicted in FIG. 8, according to some embodiments.

FIG. 11 is a block diagram depicting various layers of the electrochromic stack formed according to the process depicted in FIG. 10, according to some embodiments.

FIG. 13 is a block diagram depicting various layers of the electrochromic stack formed according to the process depicted in FIG. 12, according to some embodiments.

Figure 2:
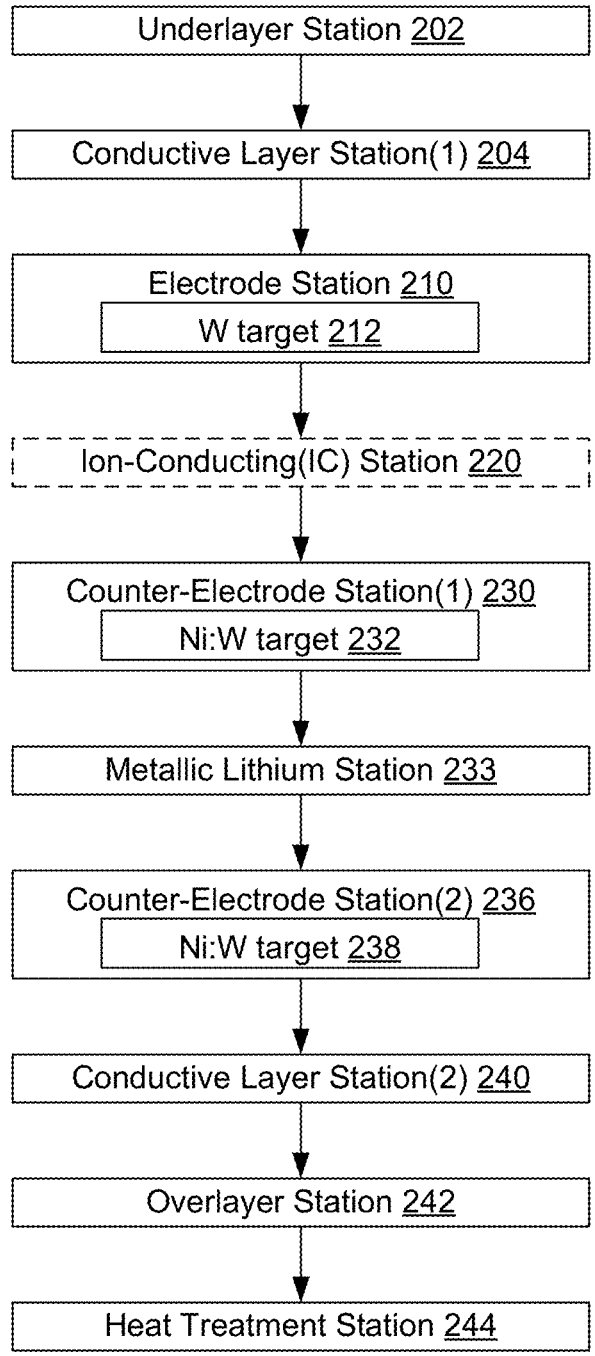
FIG. 2 is a flow diagram depicting an example of a process of forming an electrochromic stack that includes utilizing a single metallic lithium station to deposit metallic lithium within a counter-electrode layer of the electrochromic stack, according to some embodiments.

Skilled artisans appreciate that elements in the figures are illustrated for simplicity and clarity and have not necessarily been drawn to scale. For example, the dimensions of some of the elements of the figures may be exaggerated relative to other elements to help to improve understanding of embodiments of the invention.

DETAILED DESCRIPTION

The present disclosure describes a method to obtain an electrochromic stack while depositing metallic lithium in at most one deposition step (e.g., in at most one station), thus saving costs compared to solutions requiring two or more lithium deposition steps/stations. In some embodiments, a process may include depositing metallic lithium only within an electrochromic counter-electrode (also referred to herein as a "counter-electrode") of an electrochromic stack. In some embodiments, a process may include using a lithium-containing ceramic counter-electrode target (e.g., a mixed Li:Ni:W ceramic target) to form a counter-electrode and depositing metallic lithium only within or above an electrochromic electrode (also referred to herein as an "electrode") of the electrochromic stack. In some embodiments, a process may include using lithium-containing ceramic electrode target, and optionally additionally depositing metallic lithium to add mobile lithium to the electrochromic stack (e.g., in cases where the counter-electrode target is not a lithium-containing mixed target). In some embodiments, a process of forming an electrochromic stack using a single metallic lithium deposition station may including depositing a counter-electrode, an ion-conducting (IC) layer, and metallic lithium above the IC layer and below an electrode. Advantages associated with the various embodiments of the present disclosure include reducing a number of lithium sputtering compartments, which provides cost savings, improved safety, and more flexibility in the manufacturing process.

A manufacturing process for an electrochromic stack typically involves one or several steps of thermal treatment after layer deposition that crystallizes indium tin oxide (ITO) used as conductive material and that triggers a partial crystallization of the electrode and counter-electrode. Prior to experimentation, it was the inventors' understanding that it was desirable to have lithium present in both the electrode and counter-electrode prior to the thermal treatment step, in order to optimize the electrochemical properties for both, for instance the amount of mobile charge that they can accommodate. However, the inventors have observed that experimental results have shown that as the temperature of the thermal treatment increases, it is desirable to lower the amount of lithium present in the counter-electrode. This helps maximize the amount of mobile lithium that each electrode can accommodate after the thermal treatment, hence the amount of charge that can be exchanged between the electrode and the counter-electrode, and the contrast between the clear/bleached and tinted states. Varying the temperature may be desirable for several purposes. For instance, in some cases, increased mechanical resistance of the glass substrate may be obtained by tempering the coated glass at high temperature. In other cases, a bus bar frit is applied to the coated glass prior to firing, and the firing temperature may be adjusted to maximize the frit conductivity.

Hence, the inventions described herein may have various benefits. One potential benefit is allowing manufacture of electrochromic coatings with only one metallic lithium sputtering compartment in the process. Another potential benefit is introducing flexibility in the process so that, for instance, an electrochromic stack to be laminated and another electrochromic stack to be tempered can be manufactured on the same production line.

In each of the embodiments of the invention, metallic lithium can be deposited in a single deposition compartment through various types of physical vapor deposition. A first example of physical vapor deposition is evaporation of lithium. This method includes heating lithium granulates to their boiling temperature in order to deposit lithium on the substrate by evaporation. This method may provide several advantages. One advantage is allowing to reach substantial deposition rates (e.g., greater than 100 nm/min versus 10-30 nm/min in a standard magnetron sputtering process). Another advantage is increasing the uptime and reducing maintenance time, since no opening of the lithium compartment is required to feed the process with lithium. A second example of physical vapor deposition is magnetron sputtering of lithium. In a particular embodiment of a magnetron sputtering configuration, rotary targets are used (instead of planar targets) to maximize material use and increase deposition rates. Lithium targets may be cooled with a non-water-based liquid coolant (e.g., oil) in order to prevent accidental reaction of lithium with water in the event of a leak. Adjustable magnet bars may be used to improve the lithium homogeneity, being more precise than trim with sputtering gases (a typical technique) and safer than use of adjustable masks that create areas where metallic lithium can accumulate (requiring frequent cleaning).

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the term "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. The description should be read to include one or at least one and the singular also includes the plural, or vice versa, unless it is clear that it is meant otherwise.

The use of the word "about", "approximately", or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the glass, vapor deposition, and electrochromic arts.

The embodiments as illustrated in the figures and described below help in understanding particular applications for implementing the concepts as described herein. The embodiments are exemplary and not intended to limit the scope of the appended claims.

FIG. 1 illustrates capacity and contrast of tempered electrochromic electrodes and counter-electrodes. The stacks depicted in the top portion of FIG. 1 correspond to tempered electrodes, and the stacks depicted in the bottom portion of FIG. 1 correspond to tempered counter-electrodes.

Referring to the tempered electrodes in the top portion of FIG. 1, the left stack illustrates ITO/$WO_x$ (i.e., with no metallic Li deposited onto the $WO_x$ layer) after heat tempering at about 650° C. for about 5 minutes; and the right stack illustrates ITO/$WO_x$/Li (i.e., with metallic Li deposited onto the $WO_x$ layer) after heat tempering at about 650° C. for about 5 minutes. For the particular examples depicted in FIG. 1, the inventors determined that the tempered electrode with no metallic Li deposited (left side stack) had a charge capacity of 65 mC/$cm^2$ and a contrast of 14. By comparison, the inventors determined that the tempered electrode with metallic Li deposited (right side stack) had a charge capacity of 5 mC/$cm^2$ and a contrast of 2.2. Thus, for a thermal treatment at a relatively high temperature of about 650° C., the inventors have determined that the presence of lithium is detrimental to the electrochromic activity of the tempered electrode.

Referring to the tempered counter-electrodes in the bottom portion of FIG. 1, the left stack illustrates ITO/Ni$WO_x$ (i.e., no metallic Li deposited onto the Ni$WO_x$ layer) after heat tempering at about 650° C. for about 5 minutes; and the right stack illustrates ITO/Ni$WO_x$/Li (i.e., metallic Li deposited onto the Ni$WO_x$ layer) after heat tempering at about 650° C. for about 5 minutes. For the particular examples depicted in FIG. 1, the inventors determined that the tempered counter-electrode with no metallic Li deposited (left side stack) had a charge capacity of about 0 mC/cm² and a contrast of about 1. By comparison, the inventors determined that the tempered counter-electrode with metallic Li deposited (right side stack) had a charge capacity of 15 mC/cm² and a contrast of 4.5. Thus, for a thermal treatment at a relatively high temperature of about 650° C., the inventors have determined that the presence of lithium is favorable to the electrochromic activity of the tempered counter-electrode.

FIG. 2 is a flow diagram depicting an example of a process of forming an electrochromic stack that includes utilizing a single metallic lithium station to deposit metallic lithium within a counter-electrode layer of the electrochromic stack, according to some embodiments In FIG. 2, metallic lithium is sputtered "within" the counter-electrode. As illustrated and further described herein with respect to FIG. 3, a first portion of the counter-electrode may be sputtered before the metallic lithium (e.g., corresponding to a thickness of X nm), and a second portion of the counter-electrode may be sputtered after the metallic lithium (e.g., corresponding to a thickness of 270-X nm), according to some embodiments. Tuning the thickness of the counter-electrode "below" the metallic lithium in the electrochromic stack versus the thickness sputtered "above" the metallic lithium in the electrochromic stack allows for tuning the amount of lithium that diffuses to the $WO_x$ electrode during the firing process and allows for adapting the stack to different firing conditions.

The configuration depicted in FIG. 2 has an advantage of offering substantial flexibility. For instance, if non-temperable stacks and to-be-tempered stacks are manufactured on the same production line, the stacks may be submitted to substantially different heat treatments. To illustrate, non-temperable stacks may be submitted to heat treatment at about 400° C., while to-be-tempered stacks may be submitted to heat treatment at about 700° C. The position of the metallic lithium in the counter-electrode can be adjusted accordingly by varying the deposition power used in each of the counter-electrode deposition stations, according to some embodiments.

FIG. 2 illustrates a sequence of stations that may be used to form an electrochromic stack that includes utilizing a single metallic lithium station to deposit metallic lithium within a counter-electrode layer of the electrochromic stack.

An underlayer station 202 may be used to form an underlayer of an electrochromic stack. In some embodiments, the underlayer station 202 may be used to an underlayer that includes multiple materials. To illustrate, the underlayer station 202 may be used to form one portion of the underlayer from one material and another portion of the underlayer from a different material. As an illustrative, non-limiting example, the first portion of the underlayer formed at the underlayer station 202 may correspond to a first layer of a first material (e.g., $Nb_2O_5$) with a first thickness according to an electrochromic stack design. The second portion of the underlayer formed at the underlayer station 202 may correspond to a second layer of a second material (e.g., $SiO_2$) with a second thickness according to the electrochromic stack design.

Proceeding from the underlayer station 202, FIG. 2 illustrates that a first conductive layer station 204 may be used to form a first conductive layer of the electrochromic stack. In a particular embodiment, the first conductive layer station 204 may be used to form an indium tin oxide (ITO) layer with a particular thickness according to the electrochromic stack design.

Proceeding from the first conductive layer station 204, FIG. 2 illustrates that an electrode station 210 may be used to form an electrochromic electrode (EC) layer of the electrochromic stack. In the particular embodiment depicted in FIG. 2, the electrode station 210 utilizes a tungsten (W) target 212 to form a $WO_x$ EC layer with a particular thickness according to the electrochromic stack design.

Proceeding from the electrode station 210, FIG. 2 illustrates that, in some embodiments, an ion-conducting (IC) station 220 may be used to form an IC layer of the electrochromic stack. In a particular embodiment, the IC station 220 may be used to form $SiO_x$ layer with a particular thickness according to the electrochromic stack design. In alternative embodiments, as indicated by the dashed lines in FIG. 2, the IC station 220 may be omitted.

Proceeding from the IC station 220 (or from the electrode station 210 in cases where the IC station 220 is omitted), FIG. 2 illustrates that a first counter-electrode station 230 may be used to form a first portion of a counter-electrode (CE) layer of the electrochromic stack. In the example depicted in FIG. 2, the first counter-electrode station 230 utilizes a mixed nickel-tungsten (Ni:W) target 232 to form the first portion of the CE layer with a first thickness. As described further herein, the first thickness may be determined based on various factors, including the particular electrochromic stack design and the particular firing conditions such that a satisfactory amount of metallic lithium diffuses to the $WO_x$ EC layer (formed at the electrode station 210) during the firing process.

Proceeding from the first counter-electrode station 230, FIG. 2 illustrates that a single metallic lithium station 233 may be used to deposit a layer of metallic lithium onto the first portion of the CE layer. A thickness of the layer of metallic lithium may be determined based on various factors, including the particular electrochromic stack design and the particular firing conditions such that a satisfactory amount of the metallic lithium diffuses to the $WO_x$ EC layer (formed at the electrode station 210) during the firing process.

Proceeding from the single metallic lithium station 233, FIG. 2 illustrates that a second counter-electrode station 236 may be used to form a second portion of the CE layer of the electrochromic stack. In the example depicted in FIG. 2, the second counter-electrode station 236 utilizes a mixed nickel-tungsten (Ni:W) target 238 to form the second portion of the CE layer with a second thickness. As described further herein, the second thickness may be determined based on various factors, including the particular electrochromic stack design and the particular firing conditions such that a satisfactory amount of metallic lithium (deposited at the metallic lithium station 233) diffuses to the $WO_x$ EC layer (formed at the electrode station 210) during the firing process.

Tuning the thickness of the first portion of the CE layer (formed at the first CE station 230) that is "below" the metallic lithium (formed at the metallic lithium station 233) in the electrochromic stack versus the thickness of the second portion of the CE layer (formed at the second CE station 236) that is "above" the metallic lithium in the electrochromic stack allows for tuning the amount of lithium that diffuses to the $WO_x$ EC layer (formed at the electrode station 210) during the firing process and allows for adapting the stack to different firing conditions. To illustrate, non-temperable stacks may be submitted to heat treatment at about 400° C. By contrast, to-be-tempered stacks may be submitted to heat treatment at about 700° C. The position of the metallic lithium in the counter-electrode can be adjusted accordingly by varying the deposition power used in each of the counter-electrode deposition stations 230 and 236, according to some embodiments.

Proceeding from the second counter-electrode station 236, FIG. 2 illustrates that a second conductive layer station 240 may be used to form a second conductive layer of the electrochromic stack. In a particular embodiment, the second conductive layer station 240 may be used to form an ITO layer with a particular thickness according to the electrochromic stack design.

Proceeding from the second conductive layer station 240, FIG. 2 illustrates that an overlayer station 242 may be used to form an overlayer of the electrochromic stack. In a particular embodiment, the overlayer station 242 may be used to form a $SiO_x$ layer with a particular thickness according to the electrochromic stack design.

Proceeding from the overlayer station 242, FIG. 2 illustrates that a heat treatment station 244 may be used to perform a heat treatment of the electrochromic stack. As an illustrative, non-limiting example, non-temperable stacks may be submitted to heat treatment at about 400° C. at the heat treatment station 244. As another illustrative, non-limiting example, to-be-tempered stacks may be submitted to heat treatment at about 700° C. at the heat treatment station 244.

FIG. 3 is a block diagram depicting various layers of the electrochromic stack formed according to the process depicted in FIG. 2, according to some embodiments.

FIG. 3 illustrates a particular embodiment in which an underlayer 302 of the electrochromic stack (formed at the underlayer station 202 of FIG. 2) may include multiple materials. For example, a first portion of the underlayer 302 may correspond to a $Nb_2O_5$ layer having a first thickness (e.g., about 10 nm), and a second portion of the underlayer 302 may correspond to a $SiO_2$ layer having a second thickness (e.g., about 20 nm).

FIG. 3 illustrates a particular embodiment in which a first conductive layer 304 of the electrochromic stack (formed at the first conductive layer station 204 of FIG. 2) may correspond to an ITO layer having a thickness of about 420 nm.

FIG. 3 illustrates a particular embodiment in which an electrochromic electrode 310 of the electrochromic stack (formed at the electrode station 210 of FIG. 2) may correspond to a $WO_x$ EC layer having a thickness of about 400 nm.

FIG. 3 illustrates a particular embodiment in which an IC 320 of the electrochromic stack (formed at the IC station 220 of FIG. 2) may correspond to a $SiO_x$ layer having a thickness of less than 5 nm. In the examples described herein, the presence of a silicon oxide IC layer is optional.

In FIG. 3, a counter-electrode of the electrochromic stack includes a first counter-electrode portion 330 and a second counter-electrode portion 336, where metallic lithium 333 (formed at the single metallic lithium station 233 of FIG. 2) is "within" the counter-electrode between the first counter-electrode portion 330 and the second counter-electrode portion 336. FIG. 3 illustrates a particular embodiment in which the first counter-electrode portion 330 corresponds to a first $NiWO_x$ layer (formed at the first counter-electrode station 230 of FIG. 2) with a first thickness (identified as "X" nm in FIG. 3) "below" the metallic lithium 333 in the stack. The second counter-electrode portion 336 corresponds to a second $NiWO_x$ layer (formed at the second counter-electrode station 236 of FIG. 2) with a second thickness (identified as "270-X" nm in FIG. 3) "above" the metallic lithium 333 in the stack. As previously described herein with respect to FIG. 2, tuning the first thickness of the first counter-electrode portion 330 "below" the metallic lithium 333 in the electrochromic stack versus the second thickness of the second counter-electrode portion 336 "above" the metallic lithium 333 in the electrochromic stack allows for tuning the amount of metallic lithium that diffuses to the $WO_x$ electrode 310 during the firing process and allows for adapting the stack to different firing conditions. In a particular embodiment, the first thickness (X) of the first counter-electrode portion 330 may be at least 20 nm and at most 250 nm for a total counter-electrode thickness of about 270 nm.

FIG. 3 illustrates a particular embodiment in which a second conductive layer 340 of the electrochromic stack (formed at the second conductive layer station 240 of FIG. 2) may correspond to an ITO layer having a thickness of about 420 nm.

FIG. 3 illustrates a particular embodiment in which an overlayer 342 of the electrochromic stack (formed at the overlayer station 242 of FIG. 2) may correspond to a $SiO_x$ layer having a thickness of about 70 nm.

Thus, FIGS. 2 and 3 illustrate a first embodiment of the present disclosure in which a single metallic lithium station is utilized to deposit metallic lithium within a counter-electrode layer of the electrochromic stack. Tuning the thickness of a first portion of the counter-electrode "below" the metallic lithium in the electrochromic stack versus the thickness of the second portion of the counter-electrode "above" the metallic lithium in the electrochromic stack allows for tuning the amount of lithium that diffuses to the $WO_x$ electrode during the firing process and allows for adapting the stack to different firing conditions.

Figure 4:
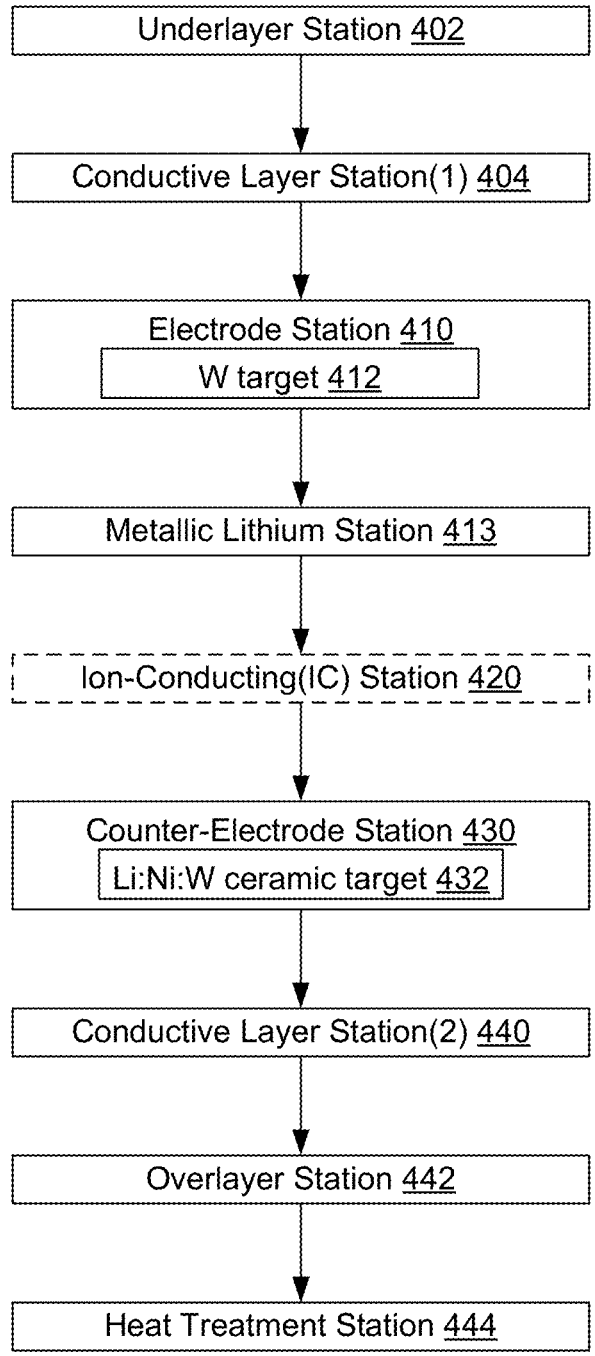
FIG. 4 is a flow diagram depicting an example of a process of forming an electrochromic stack that includes utilizing a single metallic lithium station to deposit metallic lithium onto an electrochromic electrode layer and utilizing a lithium-containing ceramic target to form a counter-electrode layer of the electrochromic stack, according to some embodiments.

FIG. 4 is a flow diagram depicting an example of a process of forming an electrochromic stack that includes utilizing a single metallic lithium station to deposit metallic lithium onto an electrochromic electrode layer and utilizing a lithium-containing ceramic target to form a counter-electrode layer of the electrochromic stack, according to some embodiments.

In FIG. 4, a ceramic target containing lithium is used to sputter the counter-electrode. Such a ceramic material is significantly easier to handle than metallic lithium and can be processed in a standard, water-cooled magnetron compartment. In this configuration, metallic lithium is still sputtered to compensate for the blind charges of the electrode and to introduce mobile lithium into the stack. The metallic lithium can, however, be sputtered in a single station. Tuning the composition of the lithium-containing ceramic counter-electrode allows for managing excess lithium that the counter-electrode needs compared to the electrode before the firing step.

FIG. 4 illustrates a sequence of stations that may be used to form an electrochromic stack that includes utilizing a single metallic lithium station to deposit metallic lithium onto an EC layer and utilizing a lithium-containing ceramic target to form a CE layer of the electrochromic stack.

An underlayer station 402 may be used to form an underlayer of an electrochromic stack. In some embodiments, the underlayer station 402 may be used to an underlayer that includes multiple materials. To illustrate, the underlayer station 402 may be used to form one portion of the underlayer from one material and another portion of the underlayer from a different material. As an illustrative, non-limiting example, the first portion of the underlayer formed at the underlayer station 402 may correspond to a first layer of a first material (e.g., $Nb_2O_5$) with a first thickness according to an electrochromic stack design. The second portion of the underlayer formed at the underlayer station 402 may correspond to a second layer of a second material (e.g., SiO$_2$) with a second thickness according to the electrochromic stack design.

Proceeding from the underlayer station 402, FIG. 4 illustrates that a first conductive layer station 404 may be used to form a first conductive layer of the electrochromic stack. In a particular embodiment, the first conductive layer station 404 may be used to form an ITO layer with a particular thickness according to the electrochromic stack design.

Proceeding from the first conductive layer station 404, FIG. 4 illustrates that an electrode station 410 may be used to form an EC layer of the electrochromic stack. In the particular embodiment depicted in FIG. 4, the electrode station 410 utilizes a tungsten (W) target 412 to form a WO$_x$ EC layer with a particular thickness according to the electrochromic stack design.

Proceeding from the electrode station 410, FIG. 4 illustrates that a single metallic lithium station 413 may be used to deposit a layer of metallic lithium onto the WO$_x$ EC layer. A thickness of the layer of metallic lithium may be determined based on various factors, including the particular electrochromic stack design and the particular firing conditions such that a satisfactory amount of the metallic lithium diffuses to the WO$_x$ EC layer during the firing process.

Proceeding from the metallic lithium station 413, FIG. 4 illustrates that, in some embodiments, an IC station 420 may be used to form an IC layer of the electrochromic stack. In a particular embodiment, the IC station 420 may be used to form SiO$_x$ layer with a particular thickness according to the electrochromic stack design. In alternative embodiments, as indicated by the dashed lines in FIG. 4, the IC station 420 may be omitted.

Proceeding from the IC station 420 (or from the electrode station 410 in cases where the IC station 420 is omitted), FIG. 4 illustrates that a counter-electrode station 430 may be used to form a CE layer of the electrochromic stack. In the example depicted in FIG. 4, the counter-electrode station 430 utilizes a mixed lithium-nickel-tungsten (Li:Ni:W) ceramic target 432 to form a LiNiWO$_x$ CE layer with a particular thickness according to the electrochromic stack design.

Proceeding from the counter-electrode station 430, FIG. 4 illustrates that a second conductive layer station 440 may be used to form a second conductive layer of the electrochromic stack. In a particular embodiment, the second conductive layer station 440 may be used to form an ITO layer with a particular thickness according to the electrochromic stack design.

Proceeding from the second conductive layer station 440, FIG. 4 illustrates that an overlayer station 442 may be used to form an overlayer of the electrochromic stack. In a particular embodiment, the overlayer station 442 may be used to form a SiO$_x$ layer with a particular thickness according to the electrochromic stack design.

Proceeding from the overlayer station 442, FIG. 4 illustrates that a heat treatment station 444 may be used to perform a heat treatment of the electrochromic stack.

Figure 5:
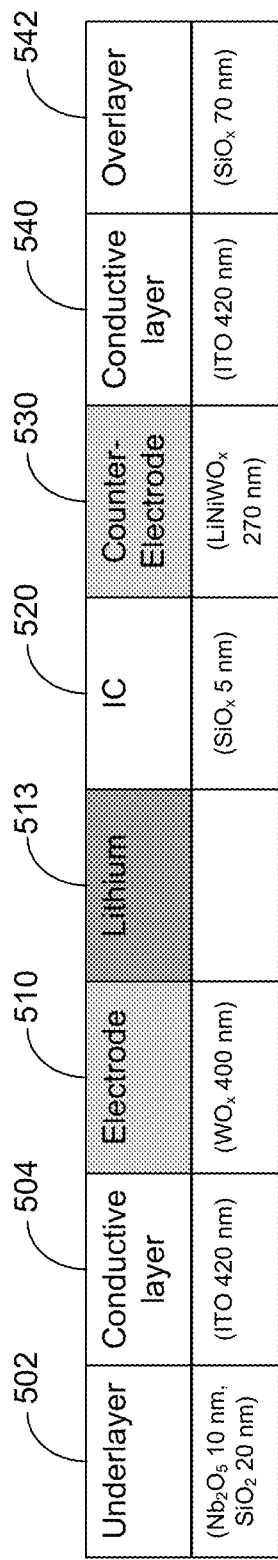
FIG. 5 is a block diagram depicting various layers of the electrochromic stack formed according to the process depicted in FIG. 4, according to some embodiments.

FIG. 5 is a block diagram depicting various layers of the electrochromic stack formed according to the process depicted in FIG. 4, according to some embodiments.

FIG. 5 illustrates a particular embodiment in which an underlayer 502 of the electrochromic stack (formed at the underlayer station 402 of FIG. 4) may include multiple materials. For example, a first portion of the underlayer 502 may correspond to a Nb$_2$O$_5$ layer having a first thickness (e.g., about 10 nm), and a second portion of the underlayer 502 may correspond to a SiO$_2$ layer having a second thickness (e.g., about 20 nm).

FIG. 5 illustrates a particular embodiment in which a first conductive layer 504 of the electrochromic stack (formed at the first conductive layer station 404 of FIG. 4) may correspond to an ITO layer having a thickness of about 420 nm.

FIG. 5 illustrates a particular embodiment in which an electrochromic electrode 510 of the electrochromic stack (formed at the electrode station 410 of FIG. 4) may correspond to a WO$_x$ EC layer having a thickness of about 400 nm.

FIG. 5 illustrates a particular embodiment in which metallic lithium 513 (formed at the single metallic lithium station 413 of FIG. 4) is "above" the EC layer 510 in the electrochromic stack. FIG. 5 illustrates a particular embodiment in which an IC 520 of the electrochromic stack (formed at the IC station 420 of FIG. 4) may correspond to a SiO$_x$ layer having a thickness of less than 5 nm. FIG. 5 illustrates a particular embodiment in which a counter-electrode 530 of the electrochromic stack may correspond to a LiNiWO$_x$ layer (formed at the counter-electrode station 430 of FIG. 4 using the mixed Li:Ni:W ceramic target 432) having a thickness of about 420 nm.

In the examples described herein, the presence of a silicon oxide IC layer is optional. Thus, while the embodiment depicted in FIG. 5 shows the metallic lithium 513 positioned between the electrode 510 and the IC 520, alternative embodiments may include the metallic lithium 513 positioned directly between the electrode 510 and the counter-electrode 530 (with no intervening IC 520).

FIG. 5 illustrates a particular embodiment in which a second conductive layer 540 of the electrochromic stack (formed at the second conductive layer station 440 of FIG. 4) may correspond to an ITO layer having a thickness of about 420 nm.

FIG. 5 illustrates a particular embodiment in which an overlayer 542 of the electrochromic stack (formed at the overlayer station 442 of FIG. 4) may correspond to a SiO$_x$ layer having a thickness of about 70 nm.

Thus, FIGS. 4 and 5 illustrate a second embodiment of the present disclosure in which a single metallic lithium station is utilized to deposit metallic lithium above an electrode layer of the electrochromic stack, and a lithium-containing ceramic counter-electrode target is utilized to form a counter-electrode layer of the electrochromic stack.

Figure 6:
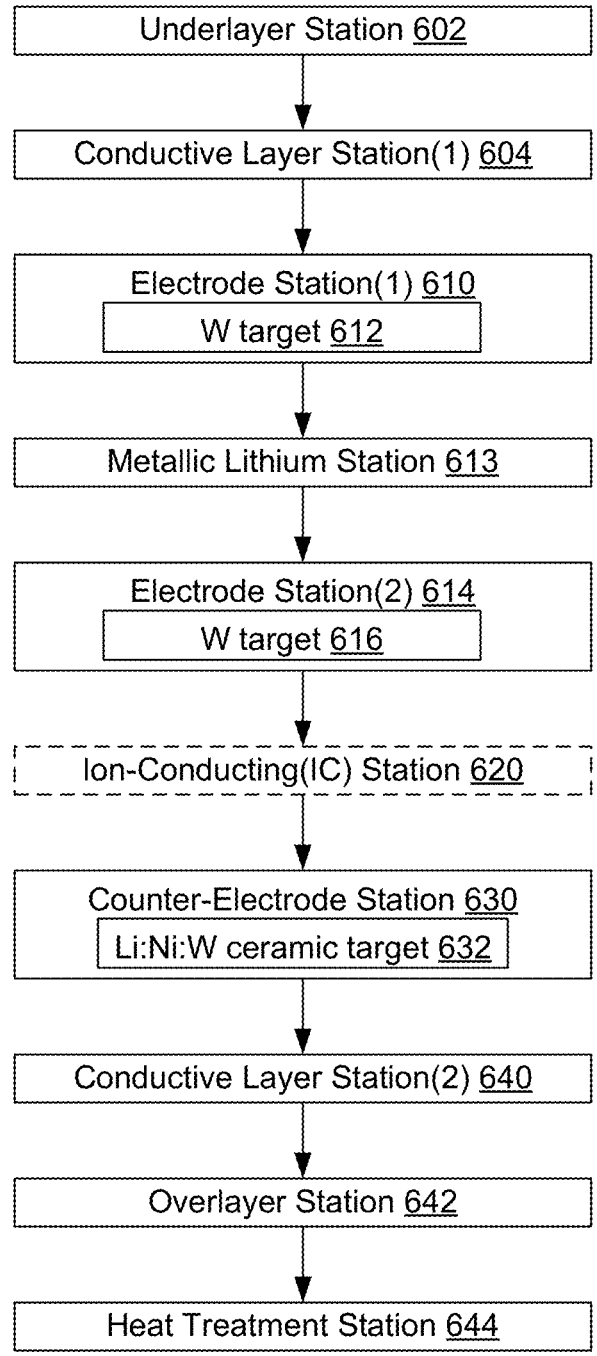
FIG. 6 is a flow diagram depicting an example of a process of forming an electrochromic stack that includes utilizing a single metallic lithium station to deposit metallic lithium within an electrochromic electrode layer and utilizing a lithium-containing ceramic target to form a counter-electrode layer of the electrochromic stack, according to some embodiments.

FIG. 6 is a flow diagram depicting an example of a process of forming an electrochromic stack that includes utilizing a single metallic lithium station to deposit metallic lithium within an electrochromic electrode layer and utilizing a lithium-containing ceramic target to form a counter-electrode layer of the electrochromic stack, according to some embodiments.

In FIG. 6, a ceramic target containing lithium is used to sputter the counter-electrode. Such a ceramic material is significantly easier to handle than metallic lithium and can be processed in a standard, water-cooled magnetron compartment. In this configuration, metallic lithium is still sputtered to compensate for the blind charges of the electrode and to introduce mobile lithium into the stack. The metallic lithium can, however, be sputtered in a single station. Tuning the composition of the lithium-containing ceramic counter-electrode allows for managing excess lithium that the counter-electrode needs compared to the electrode before the firing step.

FIG. 6 illustrates a sequence of stations that may be used to form an electrochromic stack that includes utilizing a single metallic lithium station to deposit metallic lithium "within" an EC layer and utilizing a lithium-containing ceramic target to form a CE layer of the electrochromic stack.

An underlayer station 602 may be used to form an underlayer of an electrochromic stack. In some embodiments, the underlayer station 602 may be used to an underlayer that includes multiple materials. To illustrate, the underlayer station 602 may be used to form one portion of the underlayer from one material and another portion of the underlayer from a different material. As an illustrative, non-limiting example, the first portion of the underlayer formed at the underlayer station 602 may correspond to a first layer of a first material (e.g., $Nb_2O_5$) with a first thickness according to an electrochromic stack design. The second portion of the underlayer formed at the underlayer station 602 may correspond to a second layer of a second material (e.g., $SiO_2$) with a second thickness according to the electrochromic stack design.

Proceeding from the underlayer station 602, FIG. 6 illustrates that a first conductive layer station 604 may be used to form a first conductive layer of the electrochromic stack. In a particular embodiment, the first conductive layer station 604 may be used to form an ITO layer with a particular thickness according to the electrochromic stack design.

Proceeding from the first conductive layer station 604, FIG. 6 illustrates that a first electrode station 610 may be used to form a first portion of an EC layer of the electrochromic stack. In the example depicted in FIG. 6, the first electrode station 610 utilizes a tungsten (W) target 612 to form a first portion of a $WO_x$ EC layer with a first thickness. As described further herein, the first thickness may be determined based on various factors, including the particular electrochromic stack design and the particular firing conditions.

Proceeding from the first electrode station 610, FIG. 6 illustrates that a single metallic lithium station 613 may be used to deposit a layer of metallic lithium onto the first portion of the $WO_x$ EC layer. A thickness of the layer of metallic lithium may be determined based on various factors, including the particular electrochromic stack design and the particular firing conditions.

Proceeding from the metallic lithium station 613, FIG. 6 illustrates that a second electrode station 614 may be used to form a second portion of the EC layer of the electrochromic stack. In the example depicted in FIG. 6, the second electrode station 614 utilizes a tungsten (W) target 616 to form the second portion of the $WO_x$ EC layer with a second thickness. As described further herein, the second thickness may be determined based on various factors, including the particular electrochromic stack design and the particular firing conditions.

Tuning the thickness of the first portion of the EC layer (formed at the first electrode station 610) that is "below" the metallic lithium (formed at the metallic lithium station 613) in the electrochromic stack versus the thickness of the second portion of the EC layer (formed at the second electrode station 614) that is "above" the metallic lithium in the electrochromic stack allows for adapting the stack to different firing conditions. To illustrate, non-temperable stacks may be submitted to heat treatment at about 400° C. By contrast, to-be-tempered stacks may be submitted to heat treatment at about 700° C. The position of the metallic lithium in the EC layer can be adjusted accordingly by varying the deposition power used in each of the electrode stations 610 and 614, according to some embodiments.

Proceeding from the second electrode station 614, FIG. 6 illustrates that, in some embodiments, an IC station 620 may be used to form an IC layer of the electrochromic stack. In a particular embodiment, the IC station 620 may be used to form $SiO_x$ layer with a particular thickness according to the electrochromic stack design. In alternative embodiments, as indicated by the dashed lines in FIG. 6, the IC station 620 may be omitted.

Proceeding from the IC station 620 (or from the second electrode station 614 in cases where the IC station 620 is omitted), FIG. 6 illustrates that a counter-electrode station 630 may be used to form a CE layer of the electrochromic stack. In the example depicted in FIG. 6, the counter-electrode station 630 utilizes a mixed lithium-nickel-tungsten (Li:Ni:W) ceramic target 632 to form a $LiNiWO_x$ CE layer with a particular thickness according to the electrochromic stack design.

Proceeding from the counter-electrode station 630, FIG. 6 illustrates that a second conductive layer station 640 may be used to form a second conductive layer of the electrochromic stack. In a particular embodiment, the second conductive layer station 640 may be used to form an ITO layer with a particular thickness according to the electrochromic stack design.

Proceeding from the second conductive layer station 640, FIG. 6 illustrates that an overlayer station 642 may be used to form an overlayer of the electrochromic stack. In a particular embodiment, the overlayer station 642 may be used to form a $SiO_x$ layer with a particular thickness according to the electrochromic stack design.

Proceeding from the overlayer station 642, FIG. 6 illustrates that a heat treatment station 644 may be used to perform a heat treatment of the electrochromic stack.

FIG. 7 is a block diagram depicting various layers of the electrochromic stack formed according to the process depicted in FIG. 6, according to some embodiments.

FIG. 7 illustrates a particular embodiment in which an underlayer 702 of the electrochromic stack (formed at the underlayer station 602 of FIG. 6) may include multiple materials. For example, a first portion of the underlayer 702 may correspond to a $Nb_2O_5$ layer having a first thickness (e.g., about 10 nm), and a second portion of the underlayer 702 may correspond to a $SiO_2$ layer having a second thickness (e.g., about 20 nm).

FIG. 7 illustrates a particular embodiment in which a first conductive layer 704 of the electrochromic stack (formed at the first conductive layer station 604 of FIG. 6) may correspond to an ITO layer having a thickness of about 420 nm.

In FIG. 7, an electrode of the electrochromic stack includes a first electrode portion 710 and a second electrode portion 714, where metallic lithium 713 (formed at the single metallic lithium station 613 of FIG. 6) is "within" the electrode between the first electrode portion 710 and the second electrode portion 714. FIG. 7 illustrates a particular embodiment in which the first electrode portion 710 corresponds to a first $WO_x$ layer (formed at the first electrode station 610 of FIG. 6) with a first thickness (identified as "X" nm in FIG. 7) "below" the metallic lithium 713 in the stack. The second electrode portion 714 corresponds to a second $WO_x$ layer (formed at the second electrode station 614 of FIG. 6) with a second thickness (identified as "400-X" nm in FIG. 7) "above" the metallic lithium 713 in the stack. As previously described herein with respect to FIG. 6, tuning the first thickness of the first electrode portion 710 "below" the metallic lithium 713 in the electrochromic stack versus the second thickness of the second electrode portion 714 "above" the metallic lithium 713 in the electrochromic stack allows for adapting the stack to different firing conditions. In a particular embodiment, the first thickness (X) of the first electrode portion 710 may be at least 20 nm and at most 380 nm for a total electrode thickness of about 400 nm.

FIG. 7 illustrates a particular embodiment in which an IC 720 of the electrochromic stack (formed at the IC station 620 of FIG. 6) may correspond to a $SiO_x$ layer having a thickness of less than 5 nm. In the examples described herein, the presence of a silicon oxide IC layer is optional.

FIG. 7 illustrates a particular embodiment in which a counter-electrode 730 of the electrochromic stack may correspond to a $LiNiWO_x$ layer (formed at the counter-electrode station 630 of FIG. 6 using the mixed Li:Ni:W ceramic target 632) having a thickness of about 270 nm.

FIG. 7 illustrates a particular embodiment in which a second conductive layer 740 of the electrochromic stack (formed at the second conductive layer station 640 of FIG. 6) may correspond to an ITO layer having a thickness of about 420 nm.

FIG. 7 illustrates a particular embodiment in which an overlayer 742 of the electrochromic stack (formed at the overlayer station 642 of FIG. 6) may correspond to a $SiO_x$ layer having a thickness of about 70 nm.

Thus, FIGS. 6 and 7 illustrate a third embodiment of the present disclosure in which a single metallic lithium station is utilized to deposit metallic lithium "within" an electrode layer of the electrochromic stack, and a lithium-containing ceramic counter-electrode target (e.g., $LiNiWO_x$) is utilized to form a counter-electrode layer of the electrochromic stack.

Figure 8:
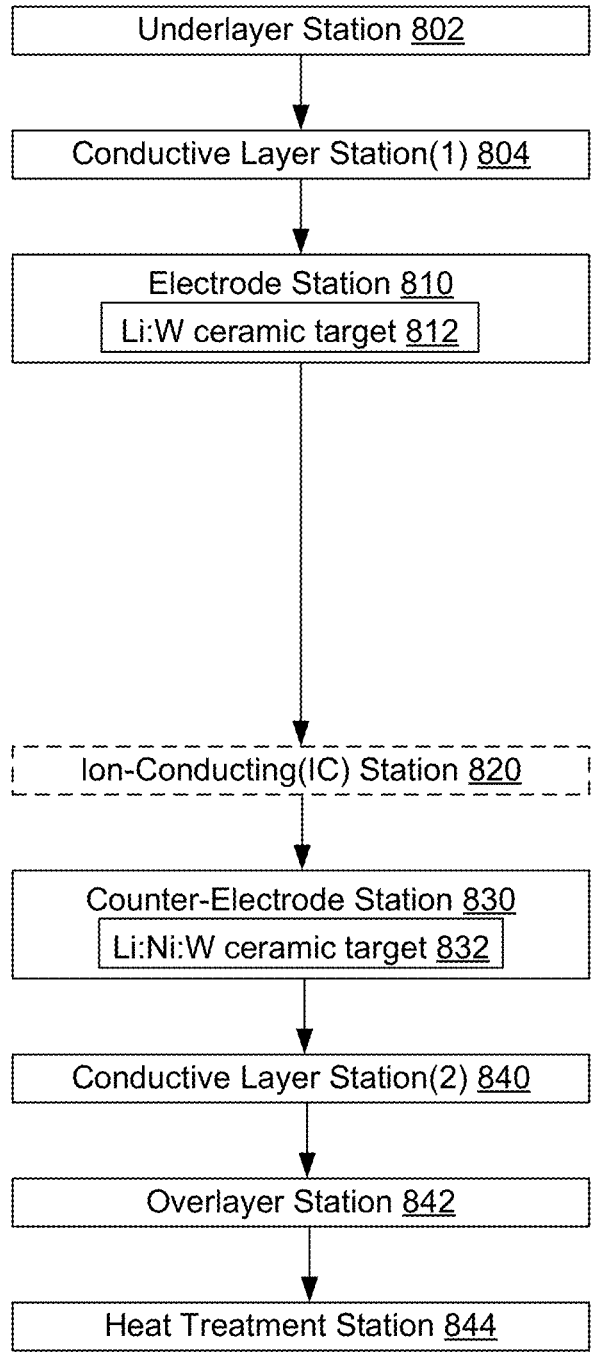
FIG. 8 is a flow diagram depicting an example of a process of forming an electrochromic stack with no metallic lithium stations by utilizing lithium-containing ceramic targets to form an electrochromic electrode layer and a counter-electrode layer of the electrochromic stack, according to some embodiments.

FIG. 8 is a flow diagram depicting an example of a process of forming an electrochromic stack by utilizing lithium-containing ceramic targets to form an electrochromic electrode layer and a counter-electrode layer of the electrochromic stack, according to some embodiments. Such ceramic materials are significantly easier to handle than metallic lithium and can be processed in a standard, water-cooled magnetron compartment. Utilizing lithium-containing ceramic targets to sputter both the electrode and the counter-electrode can potentially allow for completely removing any metallic lithium deposition process, provided that Li is in sufficient quantity in the electrode and counter-electrode, with composition $Li_xNi_yW_zO_A$ with $X>(Y+Z)/2$. In a particular embodiment, the composition of $Li_xNi_yW_zO_A$ is $(Y+Z/2)<X<(2y+Z)$.

FIG. 8 illustrates a sequence of stations that may be used to form an electrochromic stack that includes utilizing no metallic lithium station and utilizing lithium-containing ceramic targets to form an EC layer and a CE layer of the electrochromic stack.

An underlayer station 802 may be used to form an underlayer of an electrochromic stack. In some embodiments, the underlayer station 802 may be used to an underlayer that includes multiple materials. To illustrate, the underlayer station 802 may be used to form one portion of the underlayer from one material and another portion of the underlayer from a different material. As an illustrative, non-limiting example, the first portion of the underlayer formed at the underlayer station 802 may correspond to a first layer of a first material (e.g., $Nb_2O_5$) with a first thickness according to an electrochromic stack design. The second portion of the underlayer formed at the underlayer station 802 may correspond to a second layer of a second material (e.g., $SiO_2$) with a second thickness according to the electrochromic stack design.

Proceeding from the underlayer station 802, FIG. 8 illustrates that a first conductive layer station 804 may be used to form a first conductive layer of the electrochromic stack. In a particular embodiment, the first conductive layer station 804 may be used to form an ITO layer with a particular thickness according to the electrochromic stack design.

Proceeding from the first conductive layer station 804, FIG. 8 illustrates that an electrode station 810 may be used to form an EC layer of the electrochromic stack. In the example depicted in FIG. 8, the electrode station 810 utilizes a mixed lithium-tungsten (Li:W) ceramic target 812 to form a $LiWO_x$ EC layer with a particular thickness according to the electrochromic stack design.

Proceeding from the electrode station 810, FIG. 8 illustrates that, in some embodiments, an IC station 820 may be used to form an IC layer of the electrochromic stack. In a particular embodiment, the IC station 820 may be used to form $SiO_x$ layer with a particular thickness according to the electrochromic stack design. In alternative embodiments, as indicated by the dashed lines in FIG. 8, the IC station 820 may be omitted.

Proceeding from the IC station 820 (or from the electrode station 810 in cases where the IC station 820 is omitted), FIG. 8 illustrates that a counter-electrode station 830 may be used to form a CE layer of the electrochromic stack. In the example depicted in FIG. 8, the counter-electrode station 830 utilizes a mixed lithium-nickel-tungsten (Li:Ni:W) ceramic target 832 to form a $LiNiWO_x$ CE layer with a particular thickness according to the electrochromic stack design.

Proceeding from the counter-electrode station 830, FIG. 8 illustrates that a second conductive layer station 840 may be used to form a second conductive layer of the electrochromic stack. In a particular embodiment, the second conductive layer station 840 may be used to form an ITO layer with a particular thickness according to the electrochromic stack design.

Proceeding from the second conductive layer station 840, FIG. 8 illustrates that an overlayer station 842 may be used to form an overlayer of the electrochromic stack. In a particular embodiment, the overlayer station 842 may be used to form a $SiO_x$ layer with a particular thickness according to the electrochromic stack design.

Proceeding from the overlayer station 842, FIG. 8 illustrates that a heat treatment station 844 may be used to perform a heat treatment of the electrochromic stack.

FIG. 9 is a block diagram depicting various layers of the electrochromic stack formed according to the process depicted in FIG. 8, according to some embodiments.

FIG. 9 illustrates a particular embodiment in which an underlayer 902 of the electrochromic stack (formed at the underlayer station 802 of FIG. 8) may include multiple materials. For example, a first portion of the underlayer 902 may correspond to a $Nb_2O_5$ layer having a first thickness (e.g., about 10 nm), and a second portion of the underlayer 902 may correspond to a $SiO_2$ layer having a second thickness (e.g., about 20 nm).

FIG. 9 illustrates a particular embodiment in which a first conductive layer 904 of the electrochromic stack (formed at the first conductive layer station 804 of FIG. 8) may correspond to an ITO layer having a thickness of about 420 nm.

FIG. 9 illustrates a particular embodiment in which an electrode 910 of the electrochromic stack may correspond to a $LiWO_x$ layer (formed at the electrode station 810 of FIG. 8 using the mixed Li:W ceramic target 812) having a thickness of about 400 nm.

FIG. 9 illustrates a particular embodiment in which an IC 920 of the electrochromic stack (formed at the IC station 820 of FIG. 8) may correspond to a $SiO_x$ layer having a thickness of less than 5 nm. In the examples described herein, the presence of a silicon oxide IC layer is optional.

FIG. 9 illustrates a particular embodiment in which a counter-electrode 930 of the electrochromic stack may correspond to a LiNiWO$_x$ layer (formed at the counter-electrode station 830 of FIG. 8 using the mixed Li:Ni:W ceramic target 832) having a thickness of about 270 nm.

FIG. 9 illustrates a particular embodiment in which a second conductive layer 940 of the electrochromic stack (formed at the second conductive layer station 840 of FIG. 8) may correspond to an ITO layer having a thickness of about 420 nm.

FIG. 9 illustrates a particular embodiment in which an overlayer 942 of the electrochromic stack (formed at the overlayer station 842 of FIG. 8) may correspond to a SiO$_x$ layer having a thickness of about 70 nm.

Thus, FIGS. 8 and 9 illustrate a fourth embodiment of the present disclosure in which lithium-containing ceramic targets are utilized to form both an electrochromic electrode layer and an electrochromic counter-electrode layer of the electrochromic stack. Utilizing lithium-containing ceramic targets to sputter both the electrode and the counter-electrode can potentially allow for completely removing any metallic lithium deposition process, provided that Li is in sufficient quantity in the electrode and counter-electrode.

Figure 10:
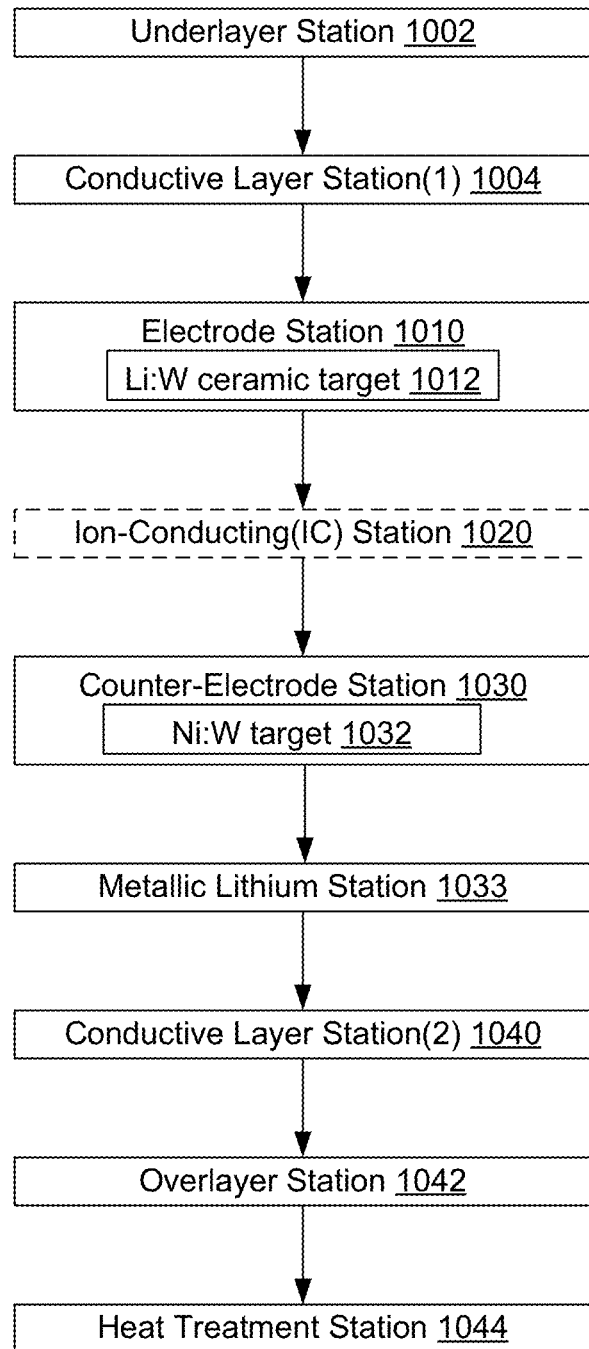
FIG. 10 is a flow diagram depicting an example of a process of forming an electrochromic stack that includes utilizing a lithium-containing ceramic target to form an electrochromic electrode layer of the electrochromic stack and utilizing a single metallic lithium station to deposit metallic lithium onto a counter-electrode layer of the electrochromic stack, according to some embodiments.

FIG. 10 is a flow diagram depicting an example of a process of forming an electrochromic stack that includes utilizing a lithium-containing ceramic target to form an electrochromic electrode layer of the electrochromic stack and utilizing a single metallic lithium station to deposit metallic lithium onto a counter-electrode layer of the electrochromic stack, according to some embodiments.

In FIG. 10, a ceramic target containing lithium is used to sputter the electrode. Such a ceramic material is significantly easier to handle than metallic lithium and can be processed in a standard, water-cooled magnetron compartment. FIG. 10 illustrates that, in some cases, a small amount of metallic lithium (corresponding to a maximum quantity of Li ions of 35 mC/cm$^2$) can optionally be sputtered to add mobile lithium to the stack. Because the amount of sputtered metallic lithium is reduced, this configuration may potentially allow for maintaining a high manufacturing speed (e.g., greater than 0.5 meters/minute) with only one pair of targets available to sputter metallic lithium. In the embodiment depicted in FIG. 10, metallic lithium is sputtered above the counter-electrode due to the positive impact of excess lithium on the electrochromic properties of that material after thermal treatment.

FIG. 10 illustrates a sequence of stations that may be used to form an electrochromic stack that includes utilizing a lithium-containing ceramic target to form an EC layer of the electrochromic stack utilizing a single metallic lithium station to deposit metallic lithium over a CE layer of the electrochromic stack.

An underlayer station 1002 may be used to form an underlayer of an electrochromic stack. In some embodiments, the underlayer station 1002 may be used to an underlayer that includes multiple materials. To illustrate, the underlayer station 1002 may be used to form one portion of the underlayer from one material and another portion of the underlayer from a different material. As an illustrative, non-limiting example, the first portion of the underlayer formed at the underlayer station 1002 may correspond to a first layer of a first material (e.g., Nb$_2$O$_5$) with a first thickness according to an electrochromic stack design. The second portion of the underlayer formed at the underlayer station 1002 may correspond to a second layer of a second material (e.g., SiO$_2$) with a second thickness according to the electrochromic stack design.

Proceeding from the underlayer station 1002, FIG. 10 illustrates that a first conductive layer station 1004 may be used to form a first conductive layer of the electrochromic stack. In a particular embodiment, the first conductive layer station 1004 may be used to form an ITO layer with a particular thickness according to the electrochromic stack design.

Proceeding from the first conductive layer station 1004, FIG. 10 illustrates that an electrode station 1010 may be used to form an EC layer of the electrochromic stack. In the example depicted in FIG. 10, the electrode station 1010 utilizes a mixed lithium-tungsten (Li:W) ceramic target 1012 to form a LiWO$_x$ EC layer with a particular thickness according to the electrochromic stack design.

Proceeding from the electrode station 1010, FIG. 10 illustrates that, in some embodiments, an IC station 1020 may be used to form an IC layer of the electrochromic stack. In a particular embodiment, the IC station 1020 may be used to form SiO$_x$ layer with a particular thickness according to the electrochromic stack design. In alternative embodiments, as indicated by the dashed lines in FIG. 10, the IC station 1020 may be omitted.

Proceeding from the IC station 1020 (or from the electrode station 1010 in cases where the IC station 1020 is omitted), FIG. 10 illustrates that a counter-electrode station 1030 may be used to form a CE layer of the electrochromic stack. In the example depicted in FIG. 10, the counter-electrode station 1030 utilizes a mixed nickel-tungsten (Ni:W) target 832 to form a NiWO$_x$ CE layer with a particular thickness according to the electrochromic stack design.

Proceeding from the counter-electrode station 1030, FIG. 10 illustrates that a single metallic lithium station 1033 may be used to deposit a layer of metallic lithium onto the NiWO$_x$ CE layer. A thickness of the layer of metallic lithium may be determined based on various factors, including the particular electrochromic stack design and the particular firing conditions.

Proceeding from the single metallic lithium station 1033, FIG. 10 illustrates that a second conductive layer station 1040 may be used to form a second conductive layer of the electrochromic stack. In a particular embodiment, the second conductive layer station 1040 may be used to form an ITO layer with a particular thickness according to the electrochromic stack design.

Proceeding from the second conductive layer station 1040, FIG. 10 illustrates that an overlayer station 1042 may be used to form an overlayer of the electrochromic stack. In a particular embodiment, the overlayer station 1042 may be used to form a SiO$_x$ layer with a particular thickness according to the electrochromic stack design.

Proceeding from the overlayer station 1042, FIG. 10 illustrates that a heat treatment station 1044 may be used to perform a heat treatment of the electrochromic stack.

FIG. 11 is a block diagram depicting various layers of the electrochromic stack formed according to the process depicted in FIG. 10, according to some embodiments.

FIG. 11 illustrates a particular embodiment in which an underlayer 1102 of the electrochromic stack (formed at the underlayer station 1002 of FIG. 10) may include multiple materials. For example, a first portion of the underlayer 1102 may correspond to a Nb$_2$O$_5$ layer having a first thickness (e.g., about 10 nm), and a second portion of the underlayer 1102 may correspond to a SiO$_2$ layer having a second thickness (e.g., about 20 nm).

FIG. 11 illustrates a particular embodiment in which a first conductive layer 1104 of the electrochromic stack (formed at the first conductive layer station 1004 of FIG. 10) may correspond to an ITO layer having a thickness of about 420 nm.

FIG. 11 illustrates a particular embodiment in which an electrode 1110 of the electrochromic stack may correspond to a $LiWO_x$ layer (formed at the electrode station 1010 of FIG. 10 using the mixed Li:W ceramic target 1012) having a thickness of about 400 nm.

FIG. 11 illustrates a particular embodiment in which an IC 1120 of the electrochromic stack (formed at the IC station 1020 of FIG. 10) may correspond to a $SiO_x$ layer having a thickness of less than 5 nm. In the examples described herein, the presence of a silicon oxide IC layer is optional.

FIG. 11 illustrates a particular embodiment in which a counter-electrode 1130 of the electrochromic stack may correspond to a $NiWO_x$ layer (formed at the counter-electrode station 1030 of FIG. 10 using the mixed Ni:W target 1032) having a thickness of about 270 nm.

FIG. 11 illustrates a particular embodiment in which metallic lithium 1133 (formed at the single metallic lithium station 1033 of FIG. 10) is "above" the CE layer 1130 in the electrochromic stack.

FIG. 11 illustrates a particular embodiment in which a second conductive layer 1140 of the electrochromic stack (formed at the second conductive layer station 1040 of FIG. 10) may correspond to an ITO layer having a thickness of about 420 nm.

FIG. 11 illustrates a particular embodiment in which an overlayer 1142 of the electrochromic stack (formed at the overlayer station 1042 of FIG. 10) may correspond to a $SiO_x$ layer having a thickness of about 70 nm.

Thus, FIGS. 10 and 11 illustrate a fifth embodiment of the present disclosure in which a lithium-containing ceramic electrode target is utilized to form an electrode layer of the electrochromic stack, and a single metallic lithium station is utilized to deposit metallic lithium above a counter-electrode layer of the electrochromic stack.

Figure 12:
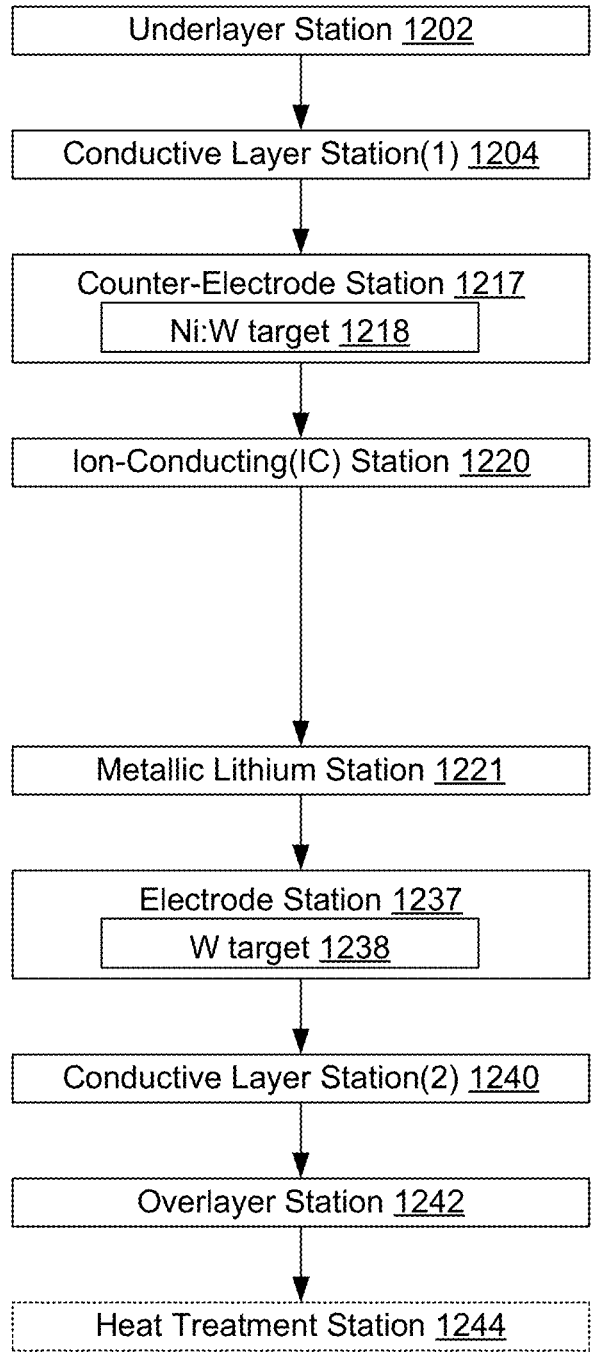
FIG. 12 is a flow diagram depicting an example of a process of forming an electrochromic stack that includes utilizing a single metallic lithium station to deposit metallic lithium between an ion-conducting (IC) layer and an electrode layer of the electrochromic stack, according to some embodiments.

FIG. 12 is a flow diagram depicting an example of a process of forming an electrochromic stack that includes utilizing a single metallic lithium station to deposit metallic lithium between an IC layer and an electrode layer of the electrochromic stack, according to some embodiments.

FIG. 12 illustrates a sequence of stations that may be used to form an electrochromic stack that includes utilizing a single metallic lithium station to deposit metallic lithium between the IC layer and the electrode layer of the electrochromic stack.

An underlayer station 1202 may be used to form an underlayer of an electrochromic stack. In some embodiments, the underlayer station 1202 may be used to an underlayer that includes multiple materials. To illustrate, the underlayer station 1202 may be used to form one portion of the underlayer from one material and another portion of the underlayer from a different material. As an illustrative, non-limiting example, the first portion of the underlayer formed at the underlayer station 1202 may correspond to a first layer of a first material (e.g., $Nb_2O_5$) with a first thickness according to an electrochromic stack design. The second portion of the underlayer formed at the underlayer station 1202 may correspond to a second layer of a second material (e.g., $SiO_2$) with a second thickness according to the electrochromic stack design.

Proceeding from the underlayer station 1202, FIG. 12 illustrates that a first conductive layer station 1204 may be used to form a first conductive layer of the electrochromic stack. In a particular embodiment, the first conductive layer station 1204 may be used to form an ITO layer with a particular thickness according to the electrochromic stack design.

Proceeding from the first conductive layer station 1204, FIG. 12 illustrates that a counter-electrode station 1217 may be used to form a CE layer of the electrochromic stack. In the example depicted in FIG. 12, the counter-electrode station 1217 utilizes a mixed nickel-tungsten (Ni:W) target 1218 to form the CE layer with a particular thickness. As described further herein, the thickness of the CE layer may be determined based on various factors, including the particular electrochromic stack design.

Proceeding from the counter-electrode station 1217, FIG. 12 illustrates that an IC station 1220 may be used to form an IC layer of the electrochromic stack. In a particular embodiment, the IC station 1220 may be used to form $SiO_x$ layer with a particular thickness according to the electrochromic stack design.

Proceeding from the IC station 1220, FIG. 12 illustrates that a single metallic lithium station 1221 may be used to deposit a layer of metallic lithium onto the IC layer. A thickness of the layer of metallic lithium may be determined based on various factors, including the particular electrochromic stack design and the particular firing conditions such that a satisfactory amount of the metallic lithium diffuses to a $WO_x$ EC layer (formed at electrode station 1237) during the firing process.

Proceeding from the single metallic lithium station 1221, FIG. 12 illustrates that an electrode station 1237 may be used to form an EC layer of the electrochromic stack. In the particular embodiment depicted in FIG. 12, the electrode station 1237 utilizes a tungsten (W) target 1238 to form a $WO_x$ EC layer with a particular thickness according to the electrochromic stack design.

Proceeding from the electrode station 1237, FIG. 12 illustrates that a second conductive layer station 1240 may be used to form a second conductive layer of the electrochromic stack. In a particular embodiment, the second conductive layer station 1240 may be used to form an ITO layer with a particular thickness according to the electrochromic stack design.

Proceeding from the second conductive layer station 1240, FIG. 12 illustrates that an overlayer station 1242 may be used to form an overlayer of the electrochromic stack. In a particular embodiment, the overlayer station 1242 may be used to form a $SiO_x$ layer with a particular thickness according to the electrochromic stack design.

Proceeding from the overlayer station 1242, FIG. 12 illustrates that, in some embodiments, an optional heat treatment station 1244 may be used to perform a heat treatment of the electrochromic stack. As an illustrative, non-limiting example, non-temperable stacks may be submitted to heat treatment at about 400° C. at the heat treatment station 1244, according to some embodiments.

FIG. 13 is a block diagram depicting various layers of the electrochromic stack formed according to the process depicted in FIG. 12, according to some embodiments.

FIG. 13 illustrates a particular embodiment in which an underlayer 1302 of the electrochromic stack (formed at the underlayer station 1202 of FIG. 12) may include multiple materials. For example, a first portion of the underlayer 1302 may correspond to a $Nb_2O_5$ layer having a first thickness (e.g., about 10 nm), and a second portion of the underlayer 1302 may correspond to a $SiO_2$ layer having a second thickness (e.g., about 30 nm).

FIG. 13 illustrates a particular embodiment in which a first conductive layer 1304 of the electrochromic stack (formed at the first conductive layer station 1204 of FIG. 12) may correspond to an ITO layer having a thickness of about 420 nm.

FIG. 13 illustrates a particular embodiment in which a CE layer 1317 of the electrochromic stack (formed at the CE layer station 1217 of FIG. 12) may correspond to a NiWO$_x$ layer having a thickness of about 270 nm.

FIG. 13 illustrates a particular embodiment in which an IC 1320 of the electrochromic stack (formed at the IC station 1220 of FIG. 12) may correspond to a SiO$_x$ layer having a thickness of less than 5 nm.

In FIG. 13, metallic lithium 1321 (formed at the single metallic lithium station 1221 of FIG. 12) is deposited "above" the IC layer 1320 and "below" an electrode layer 1337 (formed at the EC layer station 1237 of FIG. 12).

FIG. 13 illustrates a particular embodiment in which a second conductive layer 1340 of the electrochromic stack (formed at the second conductive layer station 1240 of FIG. 12) may correspond to an ITO layer having a thickness of about 420 nm.

FIG. 13 illustrates a particular embodiment in which an overlayer 1342 of the electrochromic stack (formed at the overlayer station 1242 of FIG. 12) may correspond to a SiO$_x$ layer having a thickness of about 70 nm.

Thus, FIGS. 12 and 13 illustrate another embodiment of the present disclosure in which a CE layer and an IC layer are deposited before an EC layer, and a single metallic lithium station is utilized to deposit metallic lithium "above" the IC layer and "below" the EC layer in the stack.

In some embodiments of the present disclosure, an electrochromic stack may be formed according to a process comprising: depositing, at an electrode station, an electrochromic electrode (EC) layer of an electrochromic stack; depositing, at a first counter-electrode station, a first portion of an electrochromic counter-electrode (CE) layer of the electrochromic stack; depositing, at a single metallic lithium station, metallic lithium onto the first portion of the electrochromic CE layer deposited at the first counter-electrode station; and depositing, at a second counter-electrode station, a second portion of the electrochromic CE layer onto the metallic lithium deposited at the single metallic lithium station. In some cases, the process may further include performing a heat treatment of the electrochromic stack subsequent to depositing the second portion of the electrochromic CE layer.

In some embodiments of the present disclosure, an electrochromic stack may be formed according to a process comprising: depositing, at an electrode station, at least a portion of an electrochromic electrode (EC) layer of an electrochromic stack; depositing, at a single metallic lithium station, metallic lithium onto the electrochromic EC layer deposited at the electrode station; and depositing, at a counter-electrode station, an electrochromic counter-electrode (CE) layer of the electrochromic stack utilizing a lithium-containing ceramic counter-electrode target. In some cases, the process may further include performing a heat treatment of the electrochromic stack subsequent to depositing the electrochromic CE layer.

In some embodiments of the present disclosure, an electrochromic stack may be formed according to a process comprising: depositing, at an electrode station, an electrochromic electrode (EC) layer of the electrochromic stack utilizing a lithium-containing ceramic electrode target; and depositing, at a counter-electrode station, an electrochromic counter-electrode (CE) layer of the electrochromic stack utilizing a counter-electrode target. In some cases, the process may further include performing a heat treatment of the electrochromic stack subsequent to depositing the electrochromic CE layer.

Embodiments of the present disclosure can be described in view of the following clauses:

Clause 1. A process of forming an electrochromic stack, the process comprising:
depositing, at an electrode station, an electrochromic electrode (EC) layer of an electrochromic stack;
depositing, at a first counter-electrode station, a first portion of an electrochromic counter-electrode (CE) layer of the electrochromic stack;
depositing, at a single metallic lithium station, metallic lithium onto the first portion of the electrochromic CE layer deposited at the first counter-electrode station; and
depositing, at a second counter-electrode station, a second portion of the electrochromic CE layer onto the metallic lithium deposited at the single metallic lithium station.

Clause 2. The process of clause 1, further comprising:
depositing, at an underlayer station, an underlayer of the electrochromic stack; and
depositing, at a first conductive layer station, a first conductive layer of the electrochromic stack,
wherein the electrochromic EC layer is deposited onto the first conductive layer deposited at the first conductive layer station.

Clause 3. The process of clause 2, further comprising:
depositing, at an ion-conducting (IC) station, an IC layer of the electrochromic stack onto the electrochromic EC layer deposited at the electrode station,
wherein the first portion of the electrochromic CE layer is deposited onto the IC layer deposited at the IC station.

Clause 4. The process of clause 2, wherein the first portion of the electrochromic CE layer is deposited onto the electrochromic EC layer deposited at the electrode station.

Clause 5. The process of clause 2, further comprising:
depositing, at a second conductive layer station, a second conductive layer of the electrochromic stack; and
depositing, at an overlayer station, an overlayer of the electrochromic stack.

Clause 6. The process of clause 5, further comprising performing a heat treatment of the electrochromic stack subsequent to depositing the overlayer.

Clause 7. The process of clause 1, wherein the first portion of the electrochromic CE layer has a first thickness that is not less than 20 nm, and
wherein the first portion of the electrochromic CE layer and the second portion of the electrochromic CE layer have a combined thickness of about 270 nm.

Clause 8. A process of forming an electrochromic stack, the process comprising:
depositing, at an electrode station, an electrochromic electrode (EC) layer of the electrochromic stack utilizing a lithium-containing ceramic electrode target; and
depositing, at a counter-electrode station, an electrochromic counter-electrode (CE) layer of the electrochromic stack utilizing a counter-electrode target.

Clause 9. The process of clause 8, wherein the counter-electrode target is a lithium-containing ceramic counter-electrode target.

Clause 10. The process of clause 9, wherein the lithium-containing ceramic counter-electrode target includes a mixed lithium-nickel-tungsten (Li:Ni:W) ceramic target.

Clause 11. The process of clause 8, wherein the lithium-containing ceramic electrode target includes a mixed lithium-tungsten (Li:W) ceramic target.

Clause 12. The process of clause 8, further comprising depositing, at a single metallic lithium station, metallic lithium.

Clause 13. The process of clause 12, wherein the metallic lithium is deposited onto the electrochromic CE layer deposited at the counter-electrode station.

Clause 14. The process of clause 13, wherein the ceramic counter-electrode target includes a mixed nickel-tungsten (Ni:W) target.

Clause 15. A process of forming an electrochromic stack, the process comprising:
depositing, at a counter-electrode station, an electrochromic counter-electrode (CE) layer of an electrochromic stack;
depositing, at an ion-conducting (IC) station, an IC layer of the electrochromic stack;
depositing, at a single metallic lithium station, metallic lithium onto the IC layer; and
depositing, at an electrochromic electrode (EC) station, an electrochromic EC layer onto the metallic lithium deposited at the single metallic lithium station.

Clause 16. The process of clause 15, further comprising:
depositing, at an underlayer station, an underlayer of the electrochromic stack; and
depositing, at a first conductive layer station, a first conductive layer of the electrochromic stack,
wherein the electrochromic CE layer is deposited onto the first conductive layer deposited at the first conductive layer station.

Clause 17. The process of clause 16, further comprising:
depositing, at a second conductive layer station, a second conductive layer of the electrochromic stack onto the electrochromic EC layer; and
depositing, at an overlayer station, an overlayer of the electrochromic stack onto the second conductive layer.

Clause 18. The process of clause 17, further comprising performing a heat treatment of the electrochromic stack subsequent to depositing the overlayer.

Clause 19. An electrochromic stack having a single layer of metallic lithium disposed within the electrochromic stack, the electrochromic stack comprising:
an electrochromic electrode (EC) layer;
an electrochromic counter-electrode (CE) layer overlying the electrochromic EC layer, the electrochromic CE layer comprising:
a first portion overlying the electrochromic EC layer;
metallic lithium directly overlying the first portion of the electrochromic CE layer; and
a second portion directly overlying the metallic lithium.

Clause 20. The electrochromic stack of clause 19, further comprising an ion-conducting (IC) layer disposed between the electrochromic EC layer and the first portion of the electrochromic CE layer.

Clause 21. The electrochromic stack of clause 19, wherein the first portion of the electrochromic CE layer has a first thickness that is not less than 20 nm, and wherein the first portion of the electrochromic CE layer and the second portion of the electrochromic CE layer have a combined thickness of about 270 nm.

Clause 22. An electrochromic device, comprising:
an electrochromic stack having a single layer of metallic lithium disposed within the electrochromic stack, the electrochromic stack comprising:
an electrochromic electrode (EC) layer;
an electrochromic counter-electrode (CE) layer overlying the electrochromic EC layer, the electrochromic CE layer comprising:
a first portion overlying the electrochromic EC layer;
metallic lithium directly overlying the first portion of the electrochromic CE layer; and
a second portion directly overlying the metallic lithium.

Clause 23. The electrochromic device of clause 22, further comprising an ion-conducting (IC) layer disposed between the electrochromic EC layer and the first portion of the electrochromic CE layer.

Clause 24. The electrochromic device of clause 22, wherein the first portion of the electrochromic CE layer has a first thickness that is not less than 20 nm, and wherein the first portion of the electrochromic CE layer and the second portion of the electrochromic CE layer have a combined thickness of about 270 nm.

Clause 25. An electrochromic stack having no metallic lithium disposed within the electrochromic stack, the electrochromic stack comprising:
an electrochromic electrode (EC) layer comprising a $LiWO_x$ material; and
an electrochromic counter-electrode (CE) layer overlying the electrochromic EC layer, the electrochromic CE layer comprising a $LiNiWO_x$ material.

Clause 26. The electrochromic stack of clause 25, further comprising an ion-conducting (IC) layer disposed between the electrochromic EC layer and the electrochromic CE layer.

Clause 27. An electrochromic device, comprising:
an electrochromic stack having no metallic lithium disposed within the electrochromic stack, the electrochromic stack comprising:
an electrochromic electrode (EC) layer comprising a $LiWO_x$ material; and
an electrochromic counter-electrode (CE) layer overlying the electrochromic EC layer, the electrochromic CE layer comprising a $LiNiWO_x$ material.

Clause 28. The electrochromic device of clause 27, further comprising an ion-conducting (IC) layer disposed between the electrochromic EC layer and the electrochromic CE layer.

Clause 29. An electrochromic stack having a single layer of metallic lithium disposed within the electrochromic stack, the electrochromic stack comprising: an electrochromic electrode (EC) layer, the electrochromic EC layer comprising a $LiWO_x$ material;
an electrochromic counter-electrode (CE) layer overlying the electrochromic EC layer; and
metallic lithium directly overlying the electrochromic CE layer.

Clause 30. The electrochromic stack of clause 29, further comprising an ion-conducting (IC) layer disposed between the electrochromic EC layer and the electrochromic CE layer.

Clause 31. An electrochromic device, comprising:
an electrochromic stack having a single layer of metallic lithium disposed within the electrochromic stack, the electrochromic stack comprising:
an electrochromic electrode (EC) layer, the electrochromic EC layer comprising a $LiWO_x$ material;
an electrochromic counter-electrode (CE) layer overlying the electrochromic EC layer; and
metallic lithium directly overlying the electrochromic CE layer.

Clause 32. The electrochromic device of clause 31, further comprising an ion-conducting (IC) layer disposed between the electrochromic EC layer and the electrochromic CE layer.

Clause 33. An electrochromic stack having a single layer of metallic lithium disposed within the electrochromic stack, the electrochromic stack comprising:
an electrochromic counter-electrode (CE) layer;
an ion-conducting (IC) layer directly overlying the electrochromic CE layer;
metallic lithium directly overlying the IC layer; and
an electrochromic electrode (EC) layer directly overlying the metallic lithium.

Clause 34. The electrochromic stack of clause 33, further comprising an underlayer, wherein the electrochromic CE layer overlies the underlayer.

Clause 35. The electrochromic stack of clause 33, further comprising an overlayer overlying the electrochromic EC layer.

Clause 36. An electrochromic device, comprising:
an electrochromic stack having a single layer of metallic lithium disposed within the electrochromic stack, the electrochromic stack comprising:
an electrochromic counter-electrode (CE) layer;
an ion-conducting (IC) layer directly overlying the electrochromic CE layer;
metallic lithium directly overlying the IC layer; and
an electrochromic electrode (EC) layer directly overlying the metallic lithium.

Clause 37. The electrochromic device of clause 36, further comprising:
an underlayer, wherein the electrochromic CE layer overlies the underlayer; and
an overlayer overlying the electrochromic EC layer.

Clause 38. An electrochromic stack formed according to a process comprising:
depositing, at an electrode station, an electrochromic electrode (EC) layer of an electrochromic stack;
depositing, at a first counter-electrode station, a first portion of an electrochromic counter-electrode (CE) layer of the electrochromic stack;
depositing, at a single metallic lithium station, metallic lithium onto the first portion of the electrochromic CE layer deposited at the first counter-electrode station; and
depositing, at a second counter-electrode station, a second portion of the electrochromic CE layer onto the metallic lithium deposited at the single metallic lithium station.

Clause 39. The electrochromic stack of clause 38, the process further comprising performing a heat treatment of the electrochromic stack subsequent to depositing the second portion of the electrochromic CE layer.

Clause 40. An electrochromic stack formed according to a process comprising:
depositing, at an electrode station, an electrochromic electrode (EC) layer of the electrochromic stack utilizing a lithium-containing ceramic electrode target; and
depositing, at a counter-electrode station, an electrochromic counter-electrode (CE) layer of the electrochromic stack utilizing a counter-electrode target.

Clause 41. The electrochromic stack of clause 40, the process further comprising performing a heat treatment of the electrochromic stack subsequent to depositing the electrochromic CE layer.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A process of forming an electrochromic stack, the process comprising:
depositing, at an electrode station, at least a portion of an electrochromic electrode (EC) layer of an electrochromic stack;
depositing, at a single metallic lithium station, metallic lithium onto the electrochromic EC layer deposited at the electrode station; and
depositing, at a counter-electrode station, an electrochromic counter-electrode (CE) layer of the electrochromic stack utilizing a lithium-containing ceramic counter-electrode target.

2. The process of claim 1, wherein the portion of the electrochromic EC layer of the electrochromic stack comprises a first portion, and wherein the process further comprises depositing, at a second electrode station, a second portion of the electrochromic EC layer onto the metallic lithium deposited at the single metallic lithium station.

3. The process of claim 2, wherein the first portion of the electrochromic EC layer has a first thickness that is not less than 20 nm, and wherein the first portion of the electrochromic EC layer and the second portion of the electrochromic EC layer have a combined thickness of about 400 nm.

4. The process of claim 2, further comprising depositing, at an ion-conducting (IC) station, an IC layer of the electrochromic stack onto the second portion of the electrochromic EC layer deposited at the second electrode station.

5. The process of claim 1, further comprising depositing, at an ion-conducting (IC) station, an IC layer of the electrochromic stack onto the metallic lithium deposited at the single metallic lithium station.

6. The process of claim 1, wherein the lithium-containing ceramic counter-electrode target is a mixed lithium-nickel-tungsten (Li:Ni:W) ceramic target.

7. The process of claim 1, further comprising:
depositing, at an underlayer station, an underlayer of the electrochromic stack;
depositing, at a first conductive layer station, a first conductive layer of the electrochromic stack, wherein the at least a portion of the electrochromic EC layer is deposited onto the first conductive layer deposited at the first conductive layer station;
depositing, at a second conductive layer station, a second conductive layer of the electrochromic stack wherein the electrochromic CE layer is deposited onto the second conductive layer deposited at the second conductive layer station; and
depositing, at an overlayer station, an overlayer of the electrochromic stack.

8. The process of claim 7, further comprising performing a heat treatment of the electrochromic stack subsequent to depositing the overlayer.

9. An electrochromic stack having a single layer of metallic lithium disposed within the electrochromic stack, the electrochromic stack comprising:
an electrochromic electrode (EC) layer;
a metallic lithium layer directly overlying the electrochromic EC layer, wherein the metallic lithium layer is the only layer of the electrochromic stack deposited with metallic lithium; and an electrochromic counter-electrode (CE) layer overlying the metallic lithium layer, the electrochromic CE layer comprising a LiNiWO$_x$ material.

10. The electrochromic stack of claim 9, further comprising an ion-conducting (IC) layer disposed between the metallic lithium layer and the electrochromic CE layer.

11. The electrochromic stack of claim 9, wherein:
the electrochromic EC layer includes a first portion and a second portion;
the metallic lithium layer directly overlies the first portion of the electrochromic EC layer; and
the second portion of the electrochromic EC layer directly overlies the metallic lithium layer.

12. The electrochromic stack of claim 11, further comprising an ion-conducting (IC) layer disposed between the second portion of the electrochromic EC layer and the electrochromic CE layer.

13. The electrochromic stack of claim 11, wherein the first portion of the electrochromic EC layer has a first thickness that is not less than 20 nm, and wherein the first portion of the electrochromic EC layer and the second portion of the electrochromic EC layer have a combined thickness of about 400 nm.

14. An electrochromic device, comprising:
an electrochromic stack having a single layer of metallic lithium disposed within the electrochromic stack, the electrochromic stack comprising:
an electrochromic electrode (EC) layer;
a metallic lithium layer directly overlying the electrochromic EC layer, wherein the metallic lithium layer is the only layer of the electrochromic stack deposited with metallic lithium; and
an electrochromic counter-electrode (CE) layer overlying the metallic lithium layer, the electrochromic CE layer comprising a LiNiWO$_x$ material.

15. The electrochromic device of claim 14, further comprising an ion-conducting (IC) layer disposed between the metallic lithium layer and the electrochromic CE layer.

16. The electrochromic device of claim 14, wherein:
the electrochromic EC layer of the electrochromic stack includes a first portion and a second portion;
the metallic lithium layer directly overlies the first portion of the electrochromic EC layer; and
the second portion of the electrochromic EC layer directly overlies the metallic lithium layer.

17. The electrochromic device of claim 16, further comprising an ion-conducting (IC) layer disposed between the second portion of the electrochromic EC layer and the electrochromic CE layer.

18. The electrochromic device of claim 16, wherein the first portion of the electrochromic EC layer has a first thickness that is not less than 20 nm, and wherein the first portion of the electrochromic EC layer and the second portion of the electrochromic EC layer have a combined thickness of about 400 nm.

19. An electrochromic stack formed according to a process comprising:
depositing, at an electrode station, at least a portion of an electrochromic electrode (EC) layer of an electrochromic stack;
depositing, at a single metallic lithium station, metallic lithium onto the electrochromic EC layer deposited at the electrode station; and
depositing, at a counter-electrode station, an electrochromic counter-electrode (CE) layer of the electrochromic stack utilizing a lithium-containing ceramic counter-electrode target.

20. The electrochromic stack of claim 19, the process further comprising performing a heat treatment of the electrochromic stack subsequent to depositing the electrochromic CE layer.

* * * * *